March 11, 1952 S. J. BEGUN ET AL 2,589,035

AUTOMATIC ERASE FOR MAGNETIC RECORDERS

Filed July 17, 1950 3 Sheets-Sheet 1

INVENTORS
SEMI JOSEPH BEGUN
THEODORE FRANK DEUCHER
BY
Harry C. Page
ATTORNEY

March 11, 1952 S. J. BEGUN ET AL 2,589,035

AUTOMATIC ERASE FOR MAGNETIC RECORDERS

Filed July 17, 1950 3 Sheets-Sheet 2

INVENTORS
SEMI JOSEPH BEGUN
THEODORE FRANK DEUCHER
BY
[signature]
ATTORNEY

AUTOMATIC ERASE FOR MAGNETIC RECORDERS

Filed July 17, 1950

3 Sheets-Sheet 3

INVENTORS
SEMI JOSEPH BEGUN
THEODORE FRANK DEUCHER
BY
Harry B. Beal [signature]
ATTORNEY Patented Mar. 11, 1952 2,589,035

UNITED STATES PATENT OFFICE 2,589,035

AUTOMATIC ERASE FOR MAGNETIC RECORDERS

Semi Joseph Begun, Cleveland Heights, and Theodore F. Deucher, Parma, Ohio, assignors to The Brush Development Company, Cleveland, Ohio, a corporation of Ohio Application July 17, 1950, Serial No. 174,172

5 Claims. (Cl. 179—100.2)

Figures 1, 3:
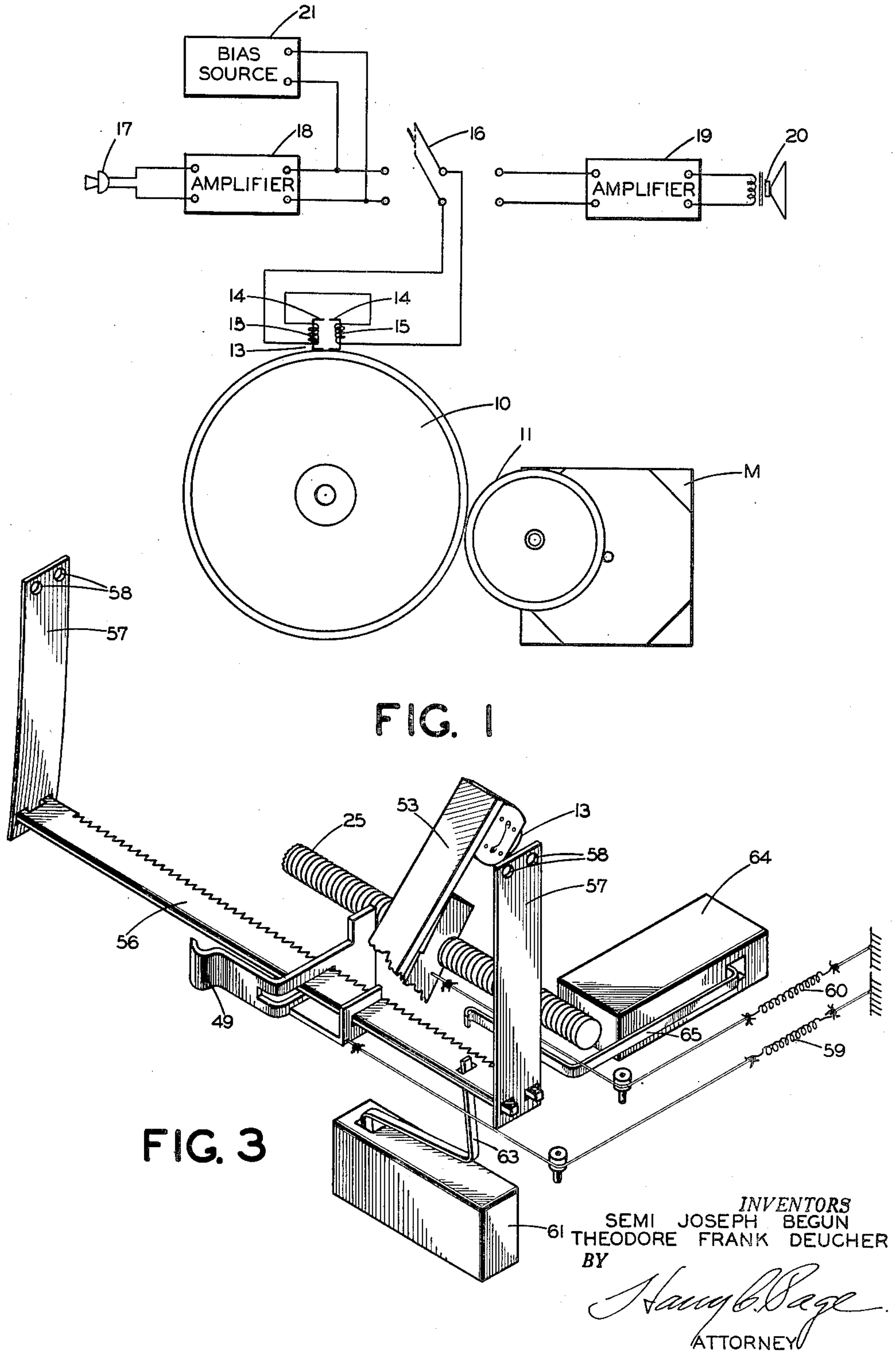

The present invention relates to an automatic erasing device for a magnetic recorder and specifically to such a device which is mechanical in nature and particularly suitable for magnetic recorders having a record member which is effectively a continuous loop or drum.

Magnetic recording and reproducing devices have found many useful commercial applications. Such devices utilize a record medium which is magnetic and, in recording thereon, variations are effected in the remanent magnetization of the record medium, these variations corresponding to the information to be recorded. In reproducing such a magnetic record, the variations in remanent magnetization of the medium are utilized to generate electrical voltages which are amplified and reproduced to provide the desired information. Various methods have been used to erase such a magnetic record member in order that a new recording can be made upon the same record member. One of the earliest erasing devices utilized a permanent magnet to saturate the record medium magnetically and recordings made thereon thereafter were caused to decrease the remanent magnetization of the record medium in accordance with the information to be recorded.

Another method which has been used in effecting erasing of a record medium so that a new record can be made thereon is that of subjecting the record member to a decreasing alternating-current field. An erasing process of this nature leaves the record medium in a substantially neutral condition magnetically and subsequent recordings are made thereon by increasing the remanent magnetization in accordance with the information to be recorded. Many magnetic recorders utilize a high-frequency alternating current superposed on the signal current during the recording process and, in such installations, it is frequently convenient to use the same high-frequency source to effect erasing by means of an alternating-current field as mentioned above.

However, if the erasing is done electrically, a separate erase head is generally required for the machine. In many installations the space requirements are such that it is inconvenient or impossible to provide an additional head for erasing purposes. Furthermore, if erasing by electrical means is provided, there is always the possibility of circuit difficulties which will have the effect of causing a failure in the erasing system at some time during the operation of the machine. This can be very annoying and sometimes very serious in an installation where the magnetic recording equipment is tied into a control system or an accounting system. An erasing device utilizing a permanent magnet, on the other hand, can be operated mechanically and its operation can easily be checked visually so that for many installations such erasing provides a most satisfactory operation. Furthermore, it is highly desirable to provide an erasing mechanism which is automatic in nature so that the record is always erased when a recording is to be made.

It is an object of the present invention to provide an improved erasing device for magnetic recorders.

It is still another object of the invention to provide an erasing device for magnetic recorders which is completely automatic and which serves to erase any record which may be on the machine at any time the machine is placed in such a condition that a recording can be made.

It is still another object of the invention to provide an erasing device for a magnetic recorder which is very reliable in operation and which is easily serviced and the operation of which can be checked visually to determine that the erasing feature of the machine is in good working order.

In accordance with the invention, a magnetic recording device comprises a recording head and a rotatable record member effectively having a plurality of record tracks to be successively traversed by the recording head during successive revolutions of the record member. Means are provided for rotating the record member and means are provided for erasing all of the above-mentioned plurality of record tracks during a single rotation of the record member. Additionally, there are provided means for conditioning the magnetic-recording device for a recording operation during which the record member is rotated, together with means responsive to this conditioning means for causing the erasing means to erase all of the above-mentioned plurality of record tracks during a single rotation of the record member and thereafter to cause the recording head to traverse the record tracks in succession for recording information thereon.

For a better understanding of the present invention, together with other and further objects thereof, reference is had to the following description taken in connection with the accompanying drawings and its scope will be pointed out in the appended claims.

Figure 2:
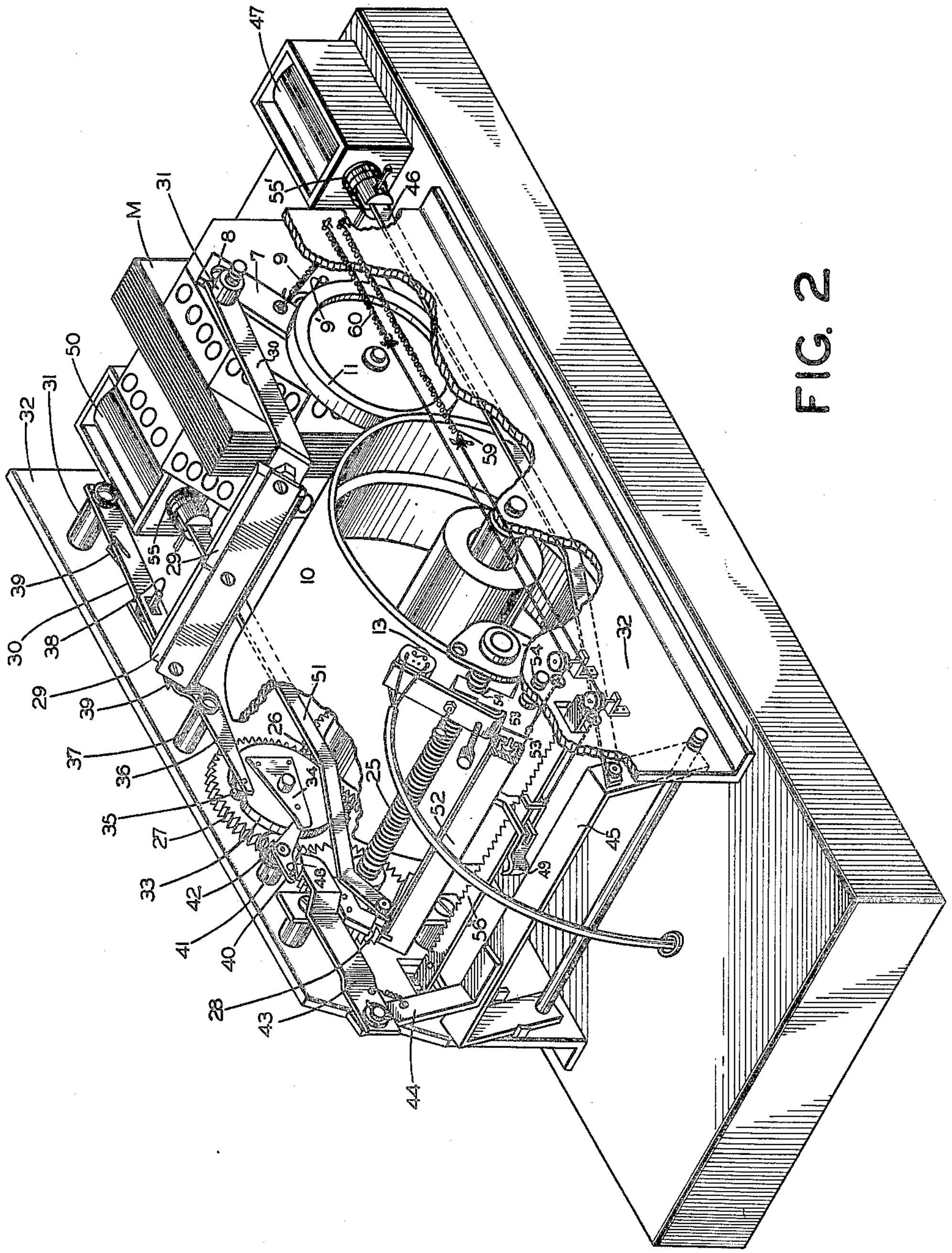
Figure 4:
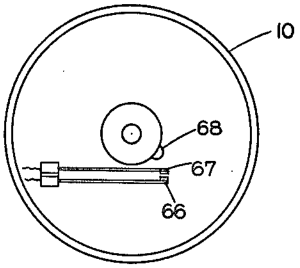
Figure 5:
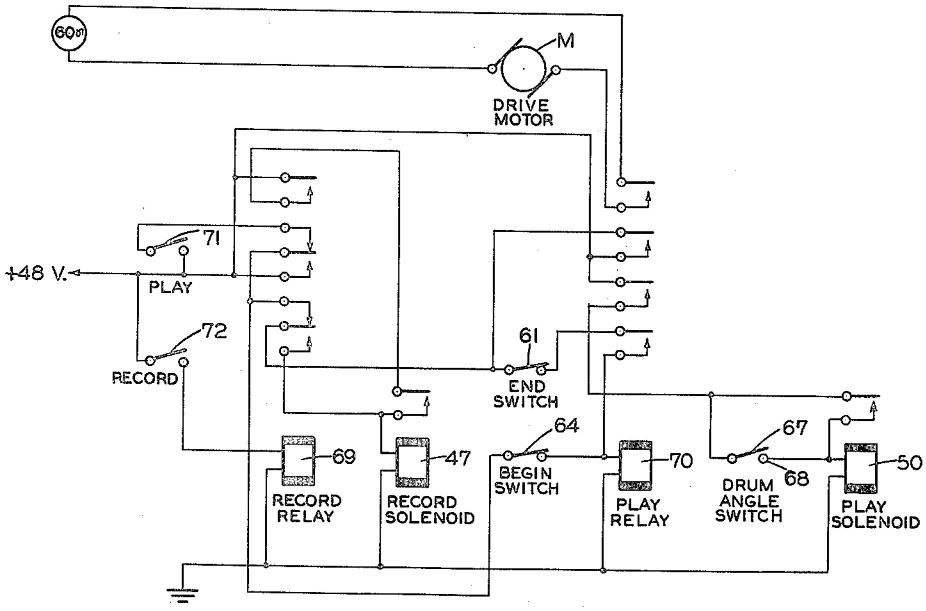

Referring now to the drawings, in Fig. 1 there is shown schematically a portion of a magnetic recording system which is utilized to illustrate the general principles involved in the magnetic recording process; Fig. 2 shows a magnetic recorder and reproducer in accordance with the invention, portions thereof being broken away to illustrate more clearly certain features of the machine; Figs. 3 and 4 illustrate certain specific features of the machine of Fig. 2; and Fig. 5 is a circuit diagram used in explaining the operation and control of the mechanical portion of the machine of Fig. 2.

Referring now more particularly to Fig. 1, the schematic arrangement there illustrated is provided primarily for illustrating the general principles of the drive system and the electrical circuits associated directly with the recording process. In Fig. 1, the reference numeral 10 illustrates a drum upon which magnetic recordings may be made. This drum may be of metal, either magnetic or non-magnetic, but if non-magnetic the surface thereof should be provided with a magnetic coating. Alternatively, a sheet of paper or plastic having a magnetic coating thereon may be placed on the drum in order to receive the magnetic record. The drum 10 is driven by a motor M through a rubber wheel 11 which bears on the motor shaft at one point and against the surface of the drum 10 at another point.

A magnetic recording and reproducing head 13 is provided. This head is shown schematically as comprising two magnetic core members 14, 14, each having thereon a coil 15, 15, which coils are connected in series and to the center terminals of a double-pole, double-throw switch 16.

In order to illustrate a source of signals to be recorded, a microphone 17 and its associated amplifier 18 are shown as being connected to one side of the double-pole, double-throw switch 16. In order to illustrate the reproducing function of the machine, an amplifier 19 and an associated loud-speaker 20 are shown as connected to the other set of switch terminals.

A bias source 21 is illustrated for supplying a suitable bias during the recording process. This bias source may be of direct current or may provide an alternating-current output having a frequency above the range of the signals to be recorded.

In considering the operation of the arrangement of Fig. 1, it will first be assumed that the switch 16 is closed to connect microphone 17 to the head 13. Under these conditions and when the motor M is energized, the drum 10 is driven and sounds picked up by the microphone 17 cause variations in the remanent magnetization in the magnetic material of the drum 10 thereby leaving a record on the drum. In order to reproduce this record, the switch 16 is thrown to connect the loadspeaker 20 to the head 13 and, under these conditions, variations in the remanent magnesium of the drum 10 cause electrical currents to be induced in the windings 15—15 which are, in turn, amplified in amplifier 19 and reproduced by the loudspeaker 20.

Coming now to the illustration of Fig. 2 which shows a preferred embodiment of the erasing device of the invention, it will first be stated that the electrical components illustrated in Fig. 1 have been omitted from the showing of Fig. 2 for the sake of clarity. The magnetic recording device of Fig. 2 does, however, illustrate the recording head 13, the motor M, the drum 10 and the drive wheel 11. The wheel 11 is carried by an arm 7, pivoted at pin 8 on the housing of the motor M and biased by a spring 9 so that the wheel 11 contacts the shaft 9' of the motor M and the drum 10. A lead screw 25 is provided for traversing the head 13 across the drum 10. This lead screw is driven through a gear 26 on the shaft of drum 10 through the medium of an idler gear 27 and a gear 28 on the shaft of the lead screw 25. The rotatable record member is preferably provided by means of a plating of magnetic material on the drum 10 and this record member effectively has a plurality of record tracks which are successively traversed by the recording head 13 during successive revolutions of the drum 10. Specifically, the head 13 travels in a spiral path axially of the drum when the motor M is energized.

The machine illustrated in Fig. 2 comprises a means for erasing all of this plurality of record tracks during a single rotation of the record member or drum 10. For the purpose of erasing the record member, permanent magnets 29, 29 are provided. These permanent magnets are mounted on arms 30, 30 which are pivoted around pins 31, 31. The side plate in the foregoing of the illustration is shown as having been broken away in order to show more clearly certain details of the machine but it will be understood that each of the two pins 31, 31 are held by the two side plates of the machine, only one of which, designated by the reference numeral 32, is illustrated. As illustrated in the drawing, the magnets 29, 29 are spaced from the drum 10 and no erasing is effected during this position of the magnets. For the purpose of moving the magnets 29, 29 into contact with the drum 10, a cam 33 is provided which is adapted to be pressed into contact with the gear 27 through the medium of a spring 34 which is carried by the cam 33. It may be preferable to provide a pin on spring 34 which is adapted to fit into an indentation in gear 27 through a hole in cam 34 in order to provide a positive lock between cam 33 and gear 27. As illustrated, the cam 33 is provided with a slot containing a roller 35 and the construction is such that, when the cam 33 is driven, the roller 35 actuates an arm 36 which is pivoted about a pin 37 and which, in turn, moves one of the arms 30 through the medium of a pin 38. A spring 39 is provided for causing the roller 35 to follow the contour of the cam 33. Rotation of the cam 33, therefore, causes the roller 35 to be driven out of the depression in cam 33 thereby raising the roller and lowering the magnets 29, 29 against the surface of the drum 10.

In the operation of the machine it is essential that the magnets 29, 29 be lowered against the drum 10 only during certain conditions of operation and, for the purpose of causing the cam 33 to be ineffective to operate the magnets 29, 29 during certain conditions of operation, a latching device is provided for holding the spring 34 and the cam 33 away from gear 27. This latching device comprises a bellcrank 40 which is pivoted upon a pin 41 which is biased counter-clockwise by means of a spring 42. One end of the bellcrank 40 is adapted to be driven between the spring 34 and the cam 33 when the motor M operates in such a manner that the pressure of the spring 34 is relieved so that cam 33 ceases to rotate. During certain conditions of operation, however, it is necessary to release the spring 34 and this is done by means of a solenoid-operated lever system which includes the levers 43, 44, 45, 46 and a record solenoid 47. Energization of the solenoid 47 thus causes the lever 43 to raise a pin 48 on one end of the bellcrank 40 and rotate the bellcrank clockwise. This removes the bellcrank 40 from contact with the spring 34. The lever 43, however, is provided with an inclined surface upon which the pin 48 bears and the contour is such that, when solenoid 47 is energized, the pin 48 is driven up this inclined surface to release the spring 34 and thereafter the pin 48 drops off the inclined surface, again allowing the bellcrank 40 to be biased in a counter-clockwise direction by means of the spring 42. Thus, when the latch provided by the bellcrank 40 and the spring 34 is released by the lever 43, the cam 33 is pressed into contact with gear 27 and rotates with gear 27 for a complete revolution of the drum 10, but at the end of this revolution, one end of bellcrank 40 enters a space between the spring 34 and the cam 33 and effectively relieves the pressure between the cam 33 and the gear 27. This mechanism is provided to cause the machine to erase only during one revolution of the drum 10.

The machine illustrated also comprises the feature of a stopping device which is effective to cause the machine to operate during a reproducing operation only over the portion of the drum 10 upon which a recording has previously been made. The feature of the machine which causes it to repeat after only the portion of the record member 10 has been covered which contains a recording thereon is described and claimed in the copending application of David P. Parkinson, Serial No. 174,209, filed on the same date as the instant application and assigned to the same assignee. This stopping feature is provided by a latching arrangement including a member 49 which is positioned at the proper point during a recording process in a manner which will be described in detail hereinafter. The head 13 is normally removed from the drum 10, but when a recording is to be made, the head 13 is moved against the drum 10 by means of a record solenoid 50 and levers 51 and 52. The head 13 is moved by an arm 53 which is pivoted on a rod 54 which runs between the two side plates 32, 32 of the machine and the arm 53 is effectively provided with a half-nut portion 54 adapted, when in operation, to contact the lead screw 25 and drive the arm 53 axially of the drum 10. A pin 53′, held by the arm 53 engages a channel portion of lever 52 in such a manner that the head 13 is moved into contact with the drum 10 when the lever 52 is moved in a clockwise direction around the rod 54. Operation of the solenoid 50 which, in turn, moves the levers 51 and 52 caused the arm 53 to be rotated to move the head 13 against the drum 10. A spring 55, associated with solenoid 50, normally keeps the head 13 removed from the drum 10 when the solenoid 50 is not energized. A similar spring 55′ is provided for solenoid 47. A portion of the arm 53, as is more clearly illustrated in Fig. 3, is adapted to move the latch 49 over to its required position as a recording is being made. The lever 45 presses against the arcuate portion of latch 49 when the record solenoid 47 is energized to move the latch 49 so that it readily can be pushed by the arm 53. The latch 49 is generally similar to the margin stops which are used on commercial typewriters and operates along a saw-tooth bar 56 which is suspended from the side plates 32, 32 of the machine by means of springs 57, 57 (see Fig. 3), pins or screws 58, 58 being utilized to hold the springs 57, 57 against the side plates 32, 32 of the machine. When the lever 45 is rotated counter-clockwise as seen in Fig. 2, a spring 59 causes the latch 49 to be locked into one of the serrations of bar 56 effectively making the latch 59 immovable. A spring 60 is provided for returning the arm 53 and the record head 13 to the starting position under certain conditions of operation which are described in detail hereinafter.

In order to provide certain additional control features, several switches are incorporated in the machine of Fig. 2. Thus, there is provided a normally closed "end" switch which is illustrated in Fig. 3 by the reference numeral 61 but which has been omitted from the showing of Fig. 2 for the sake of clarity. The switch 61 has an arm 63 which is adapted to be driven by the serrated strip 56 which it is moved against the action of springs 57, 57. In operation, the serrated strip 56 is so moved when contacted by arm 33 in certain conditions of operation, described hereinafter, when the arm 33 is being driven by lead screw 25. Also a "begin" switch is illustrated in Fig. 3 by the reference numeral 64. Here again a showing of this switch has been omitted from Fig. 2 for the sake of clarity. The switch 64 is operated by a lever 65 under certain conditions of operation, described hereinafter, when the lever 65 is contacted by the arm 53 under the influence of spring 60. This condition of operation can only occur, of course, when the arm 53 is not in contact with and being driven by the lead screw 25. Another switch which is not shown in the Fig. 2 arrangement because it is inconvenient to do so therein is illustrated by the showing of Fig. 4. This switch may be termed the "drum-angle" switch and comprises normally open contacts 66 and 67 which are adapted to be closed by a projection 68 on the hub portion of drum 10, the purpose of this switch being to provide a circuit for causing the energization of the record solenoid 50 at a predetermined instant such that the head 13 always travels the same spiral path over the drum 10. Additionally, the device of Fig. 2 includes a multi-contact relay 69 (not shown) termed the "record" relay and a multi-contact relay 70 (not shown) termed the "play" relay.

In order to describe the sequence and method of operation of the various elements which have so far been described, reference is now made to Fig. 5 wherein there is shown a schematic electrical diagram of the machine which omits the electrical features directly associated with the recording process which are illustrated in Fig. 1. Thus in Fig. 5 the solenoid 50 is illustrated as having a pair of normally open contacts which are in shunt with the drum-angle switch contacts 67—68. The play relay 70 is adapted to be energized through the normally closed contacts of the begin switch 64, a set of normally closed contacts on the record relay 69 and a "play" switch 71. The motor M is shown in Fig. 5 as being connected to a 60-cycle power source through a set of normally open contacts on the play relay 70. A "record" switch 72 is also provided for energizing record relay 69 and initiating the recording operation of the machine. The end switch 61, which is shown in Fig. 3, is also illustrated in Fig. 5 and the remaining connections and relay and solenoid contacts are as illustrated in Fig. 5.

In considering the operation of the machine which has just been described it is desirable to consider the entire cycle in several steps. First let it be assumed that a recording is to be made on the machine. In order to make this recording, the operator closes the record switch 72 which causes the record relay 69 to be energized directly from the 48-volt power source illustrated. The energization of the record relay 69 in turn energizes the play relay 70 through the begin switch 64 and a set of normally-open contacts upon the record relay 69. When the play relay 70 is thus energized, the motor M is connected to the 60-cycle power source through a set of normally open contacts on the play relay 70. The play solenoid 50 is also energized through the drum-angle switch 67, 68 and a set of normally open contacts on the play relay 70. However, the play solenoid 50 can only be energized at a particular instant during the rotation of drum 10 when the drum-angle switch 67, 68 (see Fig. 4) is closed. This insures that the head 13 will always be placed in the same spiral track on drum 10. However, once the drum-angle switch 67, 68 has been closed to energize play solenoid 50, this solenoid closes its set of normally open contacts effectively to short out the drum-angle switch 67, 68 maintaining the play solenoid energized even though drum-angle switch 67, 68 opens immediately thereafter due to the rotation of the drum 10. The record solenoid 47 is also energized through sets of normally open contacts on record relay 69 and play relay 70 so that, during the recording operation, record relay 69, play relay 70, record solenoid 47 and play solenoid 50 are all energized. Under this condition of the machine, the motor drives drum 10 which, in turn, rotates gear 27. The energization of solenoid 47 causes the bellcrank 40 to be rotated clockwise through the action of the levers 46, 45, 44, and 43, thus releasing spring 34 and causing the spring 34 to press the cam 33 against the gear 27. The cam 33 is thus driven by the gear 27 and the roller 35, following the surface of cam 33, causes the permanent magnets 29, 29 to be pressed against the surface of the drum 10. This condition endures for one complete revolution of the drum 10 after which the bellcrank 40 again engages spring 34 and releases the tension of cam 33 against the gear 27, thereby stopping the cam 33 with the pin 35 in the depression on the cam surface and causing the permanent magnets 29, 29 to stop in their position remote from the drum 10. The energization of the play relay 50 causes the head 13 to be moved against the surface of the drum 10 through the lever system 51, 52, and 53 and also causes the half-nut 54 on the arm 53 to engage the lead screw 25. Head 13 thus commences to follow a spiral path along the drum surface as soon as the solenoid 50 is energized. During this interval a recording can be made by speaking into the microphone 17 illustrated in Fig. 1 when the switch 16 is so thrown as to connect the microphone 17 to the head 13 through the amplifier 18. Due to the fact that the lever 45 presses against the arcuate portion of latch 49, the latch 49 is free to slide along the serrated bar 56 and is moved therealong by its contact with the arm 53 as is most clearly illustrated in Fig. 3.

The conditions just described endure until a recording has been made. When the recording is finished however, the record switch 72 is opened and which de-energizes all of the relays and solenoids. The de-energization of solenoid 47 causes the lever 45 to release its pressure on the arcuate part of the latching device 49 tightly locking this device in one of the teeth of the serrated lever 56. The de-energization of solenoid 50 causes the half-nut 54 to be removed from its contact with the lead screw 25 and the spring 60 is effective to pull the head 13 back to its starting position because of the fact that the lever 53 is slidable on the rod 54.

Therefore, as the operation of the machine has so far been described, a recording has been made upon the drum 10 and the latching device 49 has been set at a position which corresponds to the lengths of the recording which has been made.

It is next in order to consider the operation of the machine during a reproducing operation. When it is desired to reproduce the record which has been made on the drum 10, the play switch 71 is closed which energizes the play relay 70 through the begin switch 64 and a set of normally closed contacts on the record relay 69. The begin-switch 64 is only closed when the head 13 is in the starting position but the relay 70, when energized through the begin-switch 64, remains energized through a normally open set of contacts on play relay 70, the end-switch 71 and two pairs of normally closed contacts on the record relay 69. The play solenoid 50 is next energized through the drum-angle switch 67—68 and a set or normally open contacts of the play relay 70. Due to the normally open set of contacts on play solenoid 50, which effectively shorts drum-angle switch 67, 68, the play solenoid 50 again remains energized after the drum-angle switch is driven beyond its closed position. As thus described the head 13 is in contact with the drum 10, having been placed there on exactly the same track which was used in the recording process, and the lead screw 25 drives the head 13 along the desired path on drum 10.

Referring back to Fig. 1 and considering the switch 16 to be closed in the position connecting loudspeaker 20 to the record head 13 through amplifier 19, it will thus be seen that, under the conditions just described, the machine functions to reproduce the recording which was previously made. However, when the machine reaches the end of the recording, the lever 53 pushes against a portion of the stop device 49 as clearly illustrated in Fig. 3 due to the fact that the lever 53 is being driven by the lead screw 25. Since the latch 49 is in its locked position, this pressure against it causes a movement of the serrated bar 56 against the action of the springs 57, 57, thereby moving the lever 63 and operating the end switch 61.

It will be seen by reference to Fig. 5 that, when the end-switch 61 is open, the locking circuit of the play relay 70 is broken to de-energize the relay. This causes both the play relay 70 and the play solenoid 50 to be de-energized and the spring 60 again pulls the head 13 back to its starting position. If now the play switch 71 still remains closed, the reproducing cycle will be repeated.

The machine which has just been described was designed primarily for use in connection with complicated installations of switching equipment in order to effect certain accounting or ticket-selling operations. In one installation, the machine has been used for recording the available space in Pullmans. The installation is such that any ticket seller can contact the particular machine upon which the information he desires is recorded and listen to the recording thereon in order to determine what space is available on a particular train. This system is also such that, when a ticket is sold, the recording can be easily changed by a simple operation so that the same ticket agent or any other ticket agent interested in space on the same train thereafter will instantly receive the desired information. It is contemplated that a large number of the machines of the present invention will be utilized in the installation under consideration and that ticket agents at various remote points will have the necessary information and controls available for their purposes. It is also contemplated that the machine just described will be used in various inventory and accounting systems, wherein each particular machine is used to record some particular item or bit of information and wherein any desired machine can be contacted for the purpose of listening to its record or changing the record thereon by any desired number of authorized personnel.

While there has been described what is at present considered to be the preferred embodiment of the invention, it will be obvious to those skilled in the art that various changes and modifications may be made therein without departing from the inventon and it is, therefore, aimed to cover all such modifications and changes as fall within the true spirit and scope of the invention.

What is claimed is:

1. A magnetic recording device comprising: a recording head; a magnetizable and rotatable record member; a motor for rotating said record member; a head-traversing device driven by said motor for causing said head successively to traverse a plurality of record tracks on said record member during successive revolutions of said record member; an erasing device extending across all of said record tracks; a record-control for said magnetic recording device; an electrical circuit adapted to be energized by said record-control and effective to cause said erasing device to be operative for substantially one complete revolution of said record member, whereby all previous records on said record member are erased; a cam driven by said motor for causing said erasing device to become inoperative after said one complete revolution; and an electrical circuit adapted to be energized by said record control at a fixed position of said record member and effective to start said head in its traverse of said record tracks.

2. A magnetic recording device comprising: a recording head; a magnetizable and rotatable record member in the form of a continuous loop; a motor for rotating said record member; a head-traversing device driven by said motor for causing said head successively to traverse a plurality of record tracks on said record member during successive revolutions of said record member; an erasing device extending across all of said record tracks; a record-control for said magnetic recording device; an electrical circuit adapted to be energized by said record-control and effective to cause said erasing device to be operative for substantially one complete revolution of said record member, whereby all previous records on said record member are erased; a cam driven by said motor for causing said erasing device to become inoperative after said one complete revolution; and an electrical circuit adapted to be energized by said record-control at a fixed position of said record member and effective to start said head in its traverse of said record tracks.

3. A magnetic recording and reproducing device comprising: a recording and reproducing head; a magnetizable and rotatable record member; a motor for rotating said record member; a head-traversing device driven by said motor for causing said head successively to traverse a plurality of record tracks on said record member during successive revolutions of said record member; an erasing device extending across all of said record tracks; a record-control for said magnetic recording device; an electrical circuit adapted to be energized by said record-control and effective to cause said erasing device to be operative for substantially one complete revolution of said record member, whereby all previous records on said record member are erased; a cam driven by said motor for causing said erasing device to become inoperative after said one complete revolution; an electrical circuit adapted to be energized by said record control at a fixed position of said record member and effective to start said head in its traverse of said record tracks; a reproduce-control for said magnetic recording and reproducing device; and an electrical circuit adapted to be energized by said reproduce-control and effective to cause said erasing means to be inoperative and to cause said head means to traverse said record tracks in succession for reproducing information therefrom.

4. A magnetic recording device comprising: a recording head; a magnetizable and rotatable record member; a motor for rotating said record member; a head-traversing device driven by said motor for causing said head successively to traverse a plurality of record tracks on said record member during successive revolutions of said record member; an erasing device extending across all of said record tracks; a record-control for said magnetic recording device; an electrical circuit adapted to be energized by said record-control and effective to cause said erasing device to be operative for substantially one complete revolution of said record member, whereby all previous records on said record member are erased; a cam for causing said erasing device to become inoperative after one complete revolution; a clutch for connecting said cam to said motor; and an electrical circuit adapted to be energized by said record-control at a fixed position of said record member and effective to start said head in its traverse of said record tracks.

5. A magnetic recording device comprising: a recording head; a magnetizable and rotatable record member; a motor for rotating said record member; a head-traversing device driven by said motor for causing said head successively to traverse a plurality of record tracks on said record member during successive revolutions of said record member; an erasing device extending across all of said record tracks; a record-control for said magnetic recording device; an electrical circuit adapted to be energized by said record-control and effective to cause said erasing device to be operative for substantially one complete revolution of said record member, whereby all previous records on said record member are erased; a dam for causing said erasing device to become inoperative after one complete revolution; a solenoid-operated clutch for connecting said cam device to said motor; and an electrical circuit adapted to be energized by said record control at a fixed position of said record member and effective to start said head in its traverse of said record tracks.

SEMI JOSEPH BEGUN.
THEODORE F. DEUCHER.

REFERENCES CITED

The following references are of record in the file of this patent:

UNITED STATES PATENTS

| Number | Name | Date |
|---|---|---|
| 873,084 | Poulsen | Dec. 10, 1907 |